(12) United States Patent
Stevens

(10) Patent No.: US 7,752,969 B2
(45) Date of Patent: *Jul. 13, 2010

(54) MICRO GAS GENERATOR

(75) Inventor: Bruce A. Stevens, Oakland, MI (US)

(73) Assignee: TK Holdings, Inc., Armada, MI (US)

( * ) Notice: Subject to any disclaimer, the term of this patent is extended or adjusted under 35 U.S.C. 154(b) by 13 days.

This patent is subject to a terminal disclaimer.

(21) Appl. No.: 11/646,633

(22) Filed: Dec. 28, 2006

(65) Prior Publication Data

US 2007/0145732 A1 Jun. 28, 2007

Related U.S. Application Data

(60) Provisional application No. 60/754,458, filed on Dec. 28, 2005.

(51) Int. Cl.
*F42B 3/10* (2006.01)

(52) U.S. Cl. .............. 102/202.12; 102/202.5; 102/202.9; 102/202.14

(58) Field of Classification Search ......... 102/530–531, 102/202.5, 202.9, 202.12, 202.14; 280/728.1, 280/730.1–730.2, 733, 741
See application file for complete search history.

(56) References Cited

U.S. PATENT DOCUMENTS

| | | | | |
|---|---|---|---|---|
| 5,648,634 A | * | 7/1997 | Avory et al. | 102/202.1 |
| 6,009,809 A | * | 1/2000 | Whang | 102/202.7 |
| 6,168,202 B1 | * | 1/2001 | Stevens | 280/737 |
| 6,419,177 B2 | * | 7/2002 | Stevens | 242/374 |
| 6,460,794 B1 | * | 10/2002 | Stevens | 242/374 |
| 6,505,790 B2 | * | 1/2003 | Stevens | 242/374 |
| 6,520,443 B2 | * | 2/2003 | Stevens | 242/374 |
| 6,789,485 B2 | * | 9/2004 | Moquin et al. | 102/530 |
| 7,097,203 B2 | * | 8/2006 | Burns et al. | 280/741 |
| 7,192,055 B2 | * | 3/2007 | Stevens et al. | 280/741 |
| 7,243,946 B2 | * | 7/2007 | Stevens et al. | 280/741 |
| 7,370,885 B2 | * | 5/2008 | Stevens | 280/741 |
| 2002/0079680 A1 | * | 6/2002 | Moquin et al. | 280/736 |
| 2005/0017496 A1 | * | 1/2005 | Stevens et al. | 280/806 |
| 2005/0156075 A1 | * | 7/2005 | Stevens et al. | 242/382 |
| 2005/0189740 A1 | * | 9/2005 | Stevens | 280/728.2 |
| 2005/0189747 A1 | * | 9/2005 | Khandhadia et al. | 280/730.2 |
| 2005/0200103 A1 | * | 9/2005 | Burns et al. | 280/730.2 |

(Continued)

OTHER PUBLICATIONS

U.S. Appl. No. 11/593,707, filed Nov. 1, 2006, Bruce A. Stevens.

(Continued)

*Primary Examiner*—Michael Carone
*Assistant Examiner*—Michael D David
(74) *Attorney, Agent, or Firm*—L. C. Begin & Associates, PLLC.

(57) ABSTRACT

A gas generator usable in a vehicle occupant protection system. The gas generator includes an initiator holder and an initiator secured in the initiator holder. The initiator includes a housing enclosing an initiator charge. A metallic bore seal is secured to the initiator holder, and a casing is adhesively secured to the bore seal along an exterior surface of the bore seal. A gas generant is positioned within the casing so as to enable fluid communication between the gas generant and combustion products formed by combustion of the initiator charge, thereby enabling ignition of the gas generant.

12 Claims, 1 Drawing Sheet

U.S. PATENT DOCUMENTS

| | | | |
|---|---|---|---|
| 2005/0235863 A1* | 10/2005 | Stevens | 102/531 |
| 2006/0022443 A1* | 2/2006 | Stevens et al. | 280/736 |
| 2006/0033317 A1* | 2/2006 | Stevens | 280/741 |
| 2006/0097506 A1* | 5/2006 | Stevens | 280/806 |
| 2006/0131866 A1* | 6/2006 | Stevens et al. | 280/806 |
| 2006/0163864 A1* | 7/2006 | Dunham et al. | 280/806 |
| 2006/0219340 A1* | 10/2006 | Dunham et al. | 149/19.7 |
| 2007/0085318 A1* | 4/2007 | Stevens | 280/806 |
| 2007/0096451 A1* | 5/2007 | Stevens | 280/806 |
| 2007/0145732 A1* | 6/2007 | Stevens | 280/806 |
| 2007/0193465 A1* | 8/2007 | Stevens | 102/202.1 |
| 2007/0228013 A1* | 10/2007 | Stevens et al. | 218/1 |

OTHER PUBLICATIONS

Office Action for U.S. Appl. No. 11/593,707, filed Nov. 1, 2006.
Office Action U.S. Appl. No. 11/593,707, filed Nov. 1, 2006; Dated for Sep. 23, 2008.
Office Action U.S. Appl. No. 11/593,707, filed Nov. 1, 2006, Dated for Mar. 16, 2009.
Office Action U.S. Appl. No. 11/593,707, filed Jan. 1, 2006, Dated for Oct. 15, 2009.

* cited by examiner

MICRO GAS GENERATOR

CROSS-REFERENCE TO RELATED APPLICATIONS

This application claims the benefit of U.S. Provisional Application Ser. No. 60/754,458 filed on Dec. 28, 2005.

BACKGROUND OF THE INVENTION

The present invention relates generally to gas generating systems and, more particularly, to gas generators used in vehicle occupant protection systems and related components, such as seatbelt pretensioners.

Gas generators used in seatbelt pretensioners are known as micro gas generators due to the relatively small size of the gas generator. Exemplary pretensioners using such micro gas generators include those described in U.S. Pat. Nos. 6,460,794, 6,505,790, 6,520,443, and 6,419,177, incorporated herein by reference. Micro gas generators generally include an initiator holder for receiving and securing an initiator therein, an initiator including an initiator charge, and a gas generant composition which ignites and burns in response to activation of the initiator to produce gases for actuating the seatbelt pretensioner.

In addition, conventional micro gas generator designs usually incorporate a casing secured to the initiator holder for containing the gas generant therein and for positioning the gas generant in proximity to the initiator. The casing is secured to the initiator holder by crimping, using deformable crimp tabs machined into the structure of the holder. An O-ring or some other type of compressive seal may also be required to seal the interface between the casing and the holder.

Machining of the crimp tabs and of surfaces along the initiator holder for positioning the casing therealong increases the manufacturing complexity and cost of the initiator holder. The need for a separate compressive sealing element in the crimped design also adds to the cost of the micro gas generator assembly.

SUMMARY OF THE INVENTION

In accordance with the present invention, a gas generator usable in a vehicle occupant protection system is provided. The gas generator includes an initiator holder and an initiator secured in the initiator holder. The initiator includes a housing enclosing an initiator charge. A metallic bore seal is secured to the initiator holder, and a casing is adhesively secured to the bore seal along an exterior surface of the bore seal. A gas generant is positioned within the casing so as to enable fluid communication between the gas generant and combustion products formed by combustion of the initiator charge, thereby enabling ignition of the gas generant.

DETAILED DESCRIPTION

Figure 1:
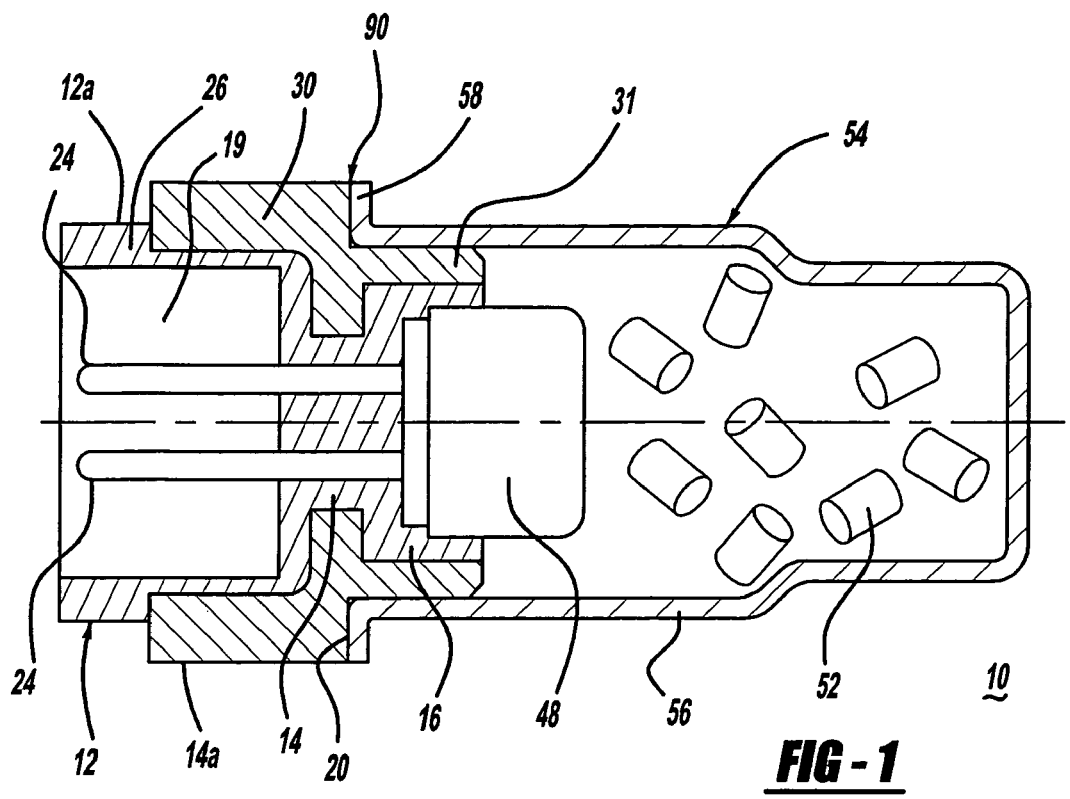
FIG. 1 is a cross-sectional side view of one embodiment of a micro gas generator incorporating an adhesively-attached casing, in accordance with the present invention.

FIG. 1 shows an embodiment of a micro gas generator 10 including a casing 54 adhesively secured to a bore seal 30 of the gas generator in accordance with the present invention. Gas generator 10 includes an initiator holder 12 for receiving and securing an initiator 48 therein. Holder 12 includes a body 14 and an annular wall 16 extending in a first direction from body 14 to define a cylindrical cavity for receiving initiator 48 therein. Holder 12 has a pair of axially extending holes through which initiator electrodes 24 extend. Another annular wall 26 extends from body 14 in a second direction, opposite the first direction, to define another cylindrical cavity housing the initiator electrodes 24. A rear portion of holder 12 is configured to provide an interface mateable with a complementary connector of a wiring harness or other suitable initiator activation signal transmission medium. Holder 12 may be formed from a metal or metal alloy using a suitable manufacturing process, such as die casting or machining. Alternatively, holder 12 may be formed from a moldable material, for example, a castable metal alloy, or a suitable polymer.

Figure 2:
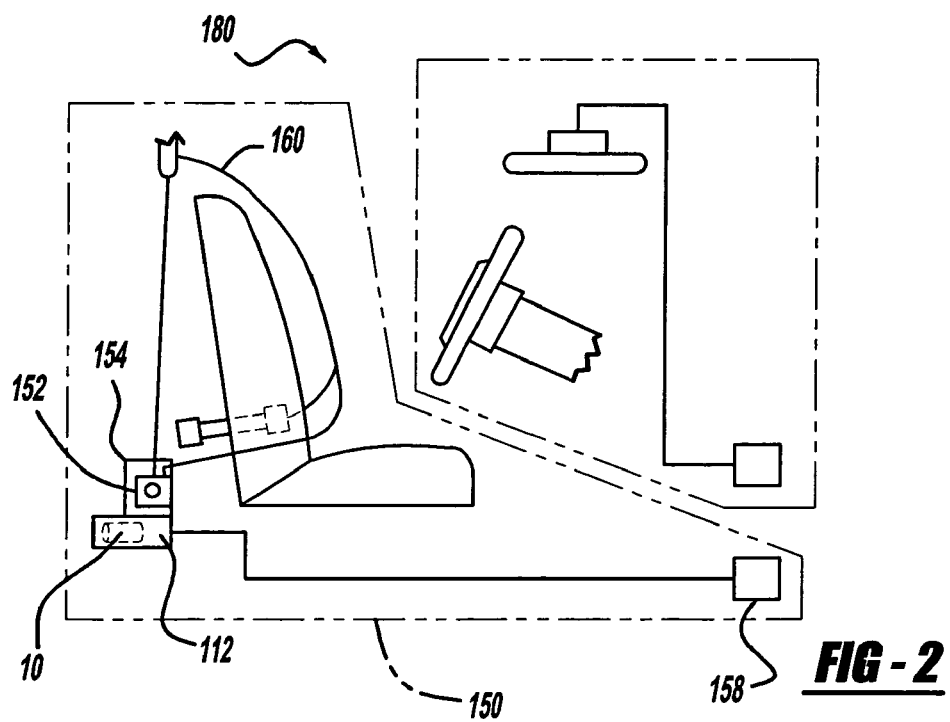
FIG. 2 is a schematic representation of an exemplary vehicle occupant protection system incorporating a micro gas generator utilizing an adhesive-mounted casing in accordance with the present invention.

Bore seal 30 encloses at least a portion of holder 12. Bore seal 30 includes an annular peripheral shoulder 20 formed therealong to enable positioning and securement of casing 54 to the bore seal. Shoulder 20 may extend along an outer surface of bore seal 30 at any desired position along the length of the bore seal. Bore seal 30 may also be configured according to the needs of a particular application to engage, for example, a portion of a vehicle (such as a housing of a seatbelt pretensioner assembly 112 as shown in FIG. 2), thereby securing the gas generator to the vehicle. In the embodiment shown herein, a portion 14a of bore seal 30 extends between an end of initiator holder 12 and the portion of the bore seal to which casing 54 (described below) is attached. This exposed portion of bore seal 30 is usable for engaging a portion of the pretensioner housing to secure the gas generator to the housing. Engagement between bore seal 30 and the pretensioner housing provides a substantially gas-tight seal which prevents generated gases from escaping from the portion of the pretensioner housing in which the gas generator is mounted. Bore seal 30 may be formed from a metal or metal alloy using a suitable manufacturing process, such as die casting or machining.

Referring again to FIG. 1, a conventional initiator 48, including a housing and an initiator charge positioned in the housing, is secured in holder 12 for igniting a gas generant composition contained in the gas generator. One exemplary initiator construction is described in U.S. Pat. No. 6,009,809, incorporated herein by reference. Initiator 48 may be inserted axially into the holder cavity, thereby seating the initiator within the cavity. The initiator may then be secured within the cavity using any of a variety of methods known in the art, including crimping, adhesive application, etc. Alternatively, in an embodiment where holder 12 is formed from a polymer or other moldable material, initiator 48 may be insert-molded into holder 12.

Referring again to FIG. 1, initiator 48 has a pair of axially-extending electrodes 24 projecting therefrom. Holder 12 has an annular wall 26 which defines a cylindrical cavity 19 housing initiator electrodes 24. Where holder 12 is formed from a polymer material, electrodes 24 may be insert-molded into the body of holder 12. In cases where the holder is formed from a conductive material, such as a metal, portions of electrodes 24 extending through holder 12 may be covered with a suitable insulating material to prevent electrical shorting therebetween.

Referring again to FIG. 1, a casing 54 is provided for containing gas generant 52 therein. Casing 54 has a body portion including an annular wall 56 and a circumferential, outwardly extending lip 58 formed along the edge of wall 56.

Casing 54 is formed from a metal or metal alloy using a suitable manufacturing process, such as drawing. Alternatively, casing 54 may be formed from a suitable polymer material.

Casing lip 58 is attached to shoulder 20 of bore seal 30 using a pressure-sensitive adhesive, generally designated 90. In one embodiment, adhesive 90 is incorporated into tape structure, for example, a double-coated tape (such as 9690 double-coated tape, available from 3M Corporation) or an adhesive transfer tape (for example, 6035PC adhesive transfer tape, also available from 3M Corporation). The tape may be pre-cut to a disk having a size and shape corresponding to a mating interface between the casing 54 and bore seal 30. The adhesive disk with a protective backing is applied to one component of the gas generator (for example, shoulder 20 of bore seal 30). After removing the backing, the adhesive 90 remains on shoulder 20, and the shoulder is ready to receive casing 54. The two components are simply pressed together to complete the joining process.

The 9690 double-coated tape comprises of a layer of pressure-sensitive acrylic adhesive applied to both sides of a carrier film. The carrier film is approximately 0.013 mm thick polyester, with a layer of adhesive approximately 0.071 mm thick on one side, and approximately 0.058 mm thick on an opposite side. The 6035PC transfer tape comprises of a layer of pressure-sensitive acrylic adhesive applied to a removable liner material. The liner is polycoated Kraft paper with an adhesive layer approximately 0.127 mm thick. Alternatively, other suitable tapes or other suitable adhesive application methods may be used. Also, suitable adhesives other than the formulations specified may be used.

Adhesive 90 holds casing 54 and bore seal 30 together during assembly, shipping, and storage of the micro gas generator. When the micro gas generator is installed in a seatbelt pretensioner, casing 54 and bore seal 30 are clamped together within the pretensioner until activation of the micro gas generator. After casing 54 and bore seal 30 are clamped together, adhesive 90 serves the additional function of providing a hermetic seal between the casing and the bore seal.

As seen in FIG. 1, an annular wall 31 or other support structure may be incorporated into bore seal 30 for providing support to casing 54, reducing the probability of radial deflection of the casing due to radially or laterally-directed loads resulting from, for example, impact on the casing due to dropping of the micro gas generator during assembly or handling. Rather than a continuous wall as shown in FIG. 1, the support structure may alternatively be formed from a plurality of projections extending from a portion of bore seal 30 to abut one or more surfaces of casing 54, thereby providing support for the casing against forces exerted thereon and attenuating the resulting stresses applied to the adhesive joint between the casing and the bore seal.

Gas generant 52 is positioned within an interior of casing 54. Generally, the gas generant composition is a fast burning, relatively easily ignitable composition. In one embodiment, the gas generant comprises silicone as a fuel at about 10-25% by weight; a perchlorate oxidizer such as ammonium, lithium, or potassium perchlorate; and a strontium salt such as strontium nitrate or strontium carbonate as a coolant. The oxidizer and coolant typically comprise about 75-90% by weight of the gas generant. The silicone may be purchased, for example, from General Electric or other well-known suppliers. Silicone provides the additional benefit of acting as a binder, facilitating the formation of the cylindrical shape described herein. The other gas generant constituents may be provided by suppliers or by manufacturing methods well known in the art. Exemplary suitable compositions are disclosed in United States Patent Application Publication No. 2001/0045735, Ser. No. 09/846,004, incorporated by reference herein.

Referring to FIG. 1, operation of the gas generator will now be discussed. Upon a crash event, a signal from a crash sensor (not shown) is conveyed to initiator 48, thereby activating the initiator and generating flame and ignition products. The flame and ignition products propagate outwardly from initiator 48 to ignite gas generant 52 which combusts to produce gases for actuating the pretensioner or other inflatable device coupled to gas generator 10. Gas pressure resulting from ignition of gas generant composition 52 causes casing 54 to rupture, thereby releasing the gases which are then channeled into the pretensioner mechanism.

Referring to FIG. 2, in a particular application, a micro gas generator 10 as described herein is incorporated into a safety belt pretensioner 112 employed in a safety belt assembly 150 used in a vehicle occupant protection system 180. Safety belt assembly 150 includes a safety belt housing 152 and a safety belt 160 extending from housing 152. A safety belt retractor mechanism 154 (for example, a spring-loaded mechanism) may be coupled to an end portion of the belt. Safety belt pretensioner 112 may be coupled to belt retractor mechanism 154 to actuate the retractor mechanism in the event of a collision. Gas generator 10 is adapted to actuate seat belt retractor mechanism 154 to pretension safety belt 160. Typical seat belt retractor mechanisms which may be used in conjunction with safety belt 160 are described in U.S. Pat. Nos. 5,743,480, 5,553,803, 5,667,161, 5,451,008, 4,558,832 and 4,597,546, incorporated herein by reference. Safety belt assembly 150 may be in communication with a known crash event sensor 158 (for example, an inertia sensor or an accelerometer) that is in operative communication with a known crash sensor algorithm (not shown) which signals actuation of belt pretensioner 112 via, for example, activation of initiator 48 (not shown in FIG. 2) in micro gas generator 10. U.S. Pat. Nos. 6,505,790 and 6,419,177 provide illustrative examples of pretensioners actuated in such a manner.

Unless otherwise noted, elements of the pretensioner may be fabricated using methods known in the art. In addition, a gas generator as described herein may be incorporated into any of a wide variety of alternative pretensioner designs. Also, it will be understood that the embodiments of the micro gas generator described herein are not limited to use in seatbelt pretensioners, but may also be used in other applications in which a compact gas generating mechanism is required.

The use of adhesive tapes or pre-forms as described herein is not limited to securement of a propellant casing to the bore seal or other element of a micro gas generator. The adhesive and application processes disclosed herein may also be used for other assembly operations, for example, securing initiators within gas generators, positioning and securing gaskets or o-rings, and securing adjacent or abutting parts in position with respect to each other without the need for crimps or tabs.

It will be understood that the foregoing description of the present invention is for illustrative purposes only, and that the various structural and operational features herein disclosed are susceptible to a number of modifications, none of which departs from the spirit and scope of the present invention. The preceding description, therefore, is not meant to limit the scope of the invention. Rather, the scope of the invention is to be determined only by the appended claims and their equivalents.

What is claimed is:

1. A method for manufacturing a gas generator comprising the steps of:

providing an initiator holder having a metallic bore seal secured thereto;

providing a casing; and adhesively securing the casing to the bore seal along an exterior surface of the bore seal so that a portion of the bore seal extending from the bore seal abuts the casing.

2. The gas generator of claim 1 wherein the portion of the bore seal comprises a continuous wall abutting an interior surface of the casing.

3. The method of claim 1 wherein the step of providing an initiator holder comprises providing a portion of the initiator holder defining an interface mateable with a complementary interface of an initiator activation signal transmission medium.

4. The method of claim 1 wherein the step of providing an initiator holder comprises the step of forming the initiator holder from a moldable metal alloy.

5. The method of claim 1 wherein the step of providing an initiator holder comprises the step of forming the initiator holder from a polymer material.

6. The method of claim 1 wherein a portion of the bore seal resides between an end of the initiator holder and a portion of the bore seal to which the casing is attached, for engaging a portion of a vehicle to secure the gas generator to the vehicle.

7. A vehicle occupant protection system including a gas generator manufactured using a method according to claim 1.

8. A seatbelt pretensioner including a gas generator manufactured using a method according to claim 1.

9. The method of claim 1 wherein the step of securing an initiator in the initiator holder comprises the step of securing the initiator in the initiator holder using an adhesive.

10. The method of claim 1 wherein the step of securing an initiator in the initiator holder comprises the step of securing the initiator in the initiator holder using a crimp.

11. The method of claim 1 further comprising, prior to the step of adhesively securing the casing, the steps of:

securing an initiator in the initiator holder, the initiator including a housing enclosing an initiator charge; and positioning a gas generant material within the casing so as to enable fluid communication between the gas generant and combustion products formed by combustion of the initiator charge after the casing is secured to the bore seal, thereby enabling ignition of the gas generant.

12. A method for manufacturing a gas generator comprising:

providing an initiator holder having a metallic bore seal secured thereto for engaging a device exterior of the gas generator to which the gas generator is coupled, to form a substantially gas-tight seal between the gas generator and the device;

providing a casing; and adhesively securing the casing to the bore seal along an exterior surface of the bore seal so that the casing abutting the bore seal along the surface of the bore seal.

* * * * *

UNITED STATES PATENT AND TRADEMARK OFFICE
CERTIFICATE OF CORRECTION

PATENT NO. : 7,752,969 B2  Page 1 of 1
APPLICATION NO. : 11/646633
DATED : July 13, 2010
INVENTOR(S) : Stevens It is certified that error appears in the above-identified patent and that said Letters Patent is hereby corrected as shown below:

Column 5; Claim 2; Line 7; delete "The gas generator" and insert --The method--

Signed and Sealed this

Sixteenth Day of November, 2010

David J. Kappos
*Director of the United States Patent and Trademark Office*